US010985381B2

(12) United States Patent
Kim et al.

(10) Patent No.: US 10,985,381 B2
(45) Date of Patent: Apr. 20, 2021

(54) NANOSTRUCTURED ELECTRODE FOR POLYMER ELECTROLYTE MEMBRANE FUEL CELL, AND MANUFACTURING METHOD THEREFOR

(71) Applicant: KOLON INDUSTRIES, INC., Seoul (KR)

(72) Inventors: Jung Ho Kim, Yongin-si (KR); Han Moon Cho, Yongin-si (KR); Hyeong Su Kim, Yongin-si (KR); Gyong Bum Ko, Yongin-si (KR)

( * ) Notice: Subject to any disclaimer, the term of this patent is extended or adjusted under 35 U.S.C. 154(b) by 413 days.

(21) Appl. No.: 16/079,815

(22) PCT Filed: Mar. 27, 2017

(86) PCT No.: PCT/KR2017/003264
§ 371 (c)(1),
(2) Date: Aug. 24, 2018

(87) PCT Pub. No.: WO2017/171328
PCT Pub. Date: Oct. 5, 2017

(65) Prior Publication Data

US 2020/0335799 A1 Oct. 22, 2020

(30) Foreign Application Priority Data

Mar. 30, 2016 (KR) ........................ 10-2016-0038437

(51) Int. Cl.
*H01M 4/02* (2006.01)
*H01M 4/90* (2006.01)
(Continued)

(52) U.S. Cl.
CPC ....... *H01M 4/9075* (2013.01); *H01M 4/8605* (2013.01); *H01M 4/8828* (2013.01); *H01M 8/1018* (2013.01); *H01M 2008/1095* (2013.01)

(58) Field of Classification Search
CPC ...................................................... H01M 8/04
See application file for complete search history.

(56) References Cited

U.S. PATENT DOCUMENTS 7,638,216 B2 12/2009 Yang et al.
2004/0141908 A1 7/2004 Hara et al.
(Continued)

FOREIGN PATENT DOCUMENTS

JP 2004-172098 A 6/2004
JP 2007172887 A 7/2007
(Continued)

OTHER PUBLICATIONS

Julien Marie, et al., "Highly porous PEM fuel cell cathodes based on low density carbon aerogels as Pt-support: Experimental study of the mass-transport losses", Journal of Power Sources, 2009, vol. 190, No. 2, pp. 423-434 (12 pages total).
(Continued)

*Primary Examiner* — Jacob B Marks

(57) ABSTRACT

A nanostructured electrode for a polymer electrolyte fuel cell, a manufacturing method thereof, and a fuel cell including the nanostructured electrode are provided. The nanostructured electrode includes: a three-dimensional nanostructure including a nanoporous aerogel and an ionomer surrounding the surface of the aerogel; and a catalyst dispersed in the three-dimensional nanostructure. The electrode can obtain excellent current density and power density even with a relatively small amount of catalyst by having improved catalyst performance due to nanostructuring of an ionomer, uniform catalyst dispersion and increased catalyst utilization ratio, can also obtain a price reduction effect through a decrease in the amount of catalyst used, and is excellent in the mass transfer efficiency and low humidification performance.

15 Claims, 3 Drawing Sheets

(51) Int. Cl.

| | |
|---|---|
| ***H01M 4/86*** | (2006.01) |
| ***H01M 4/88*** | (2006.01) |
| ***H01M 8/1018*** | (2016.01) |

(56) References Cited

U.S. PATENT DOCUMENTS

| | | | | |
|---|---|---|---|---|
| 2006/0116463 | A1 | 6/2006 | Erkey et al. | |
| 2012/0244457 | A1* | 9/2012 | Kwon | H01M 4/8807 429/532 |
| 2016/0293972 | A1* | 10/2016 | Tour | H01M 4/96 |

FOREIGN PATENT DOCUMENTS

| | | | |
|---|---|---|---|
| JP | 2015048543 | A | 3/2015 |
| JP | 2015228378 | A | 12/2015 |
| JP | 2016001568 | A | 1/2016 |
| KR | 10-0814840 | B1 | 3/2008 |
| KR | 10-2009-0055300 | A | 6/2009 |
| KR | 10-2011-0085677 | A | 7/2011 |
| KR | 10-2012-0060487 | A | 6/2012 |
| KR | 10-2012-0107397 | A | 10/2012 |
| KR | 10-2012-0134460 | A | 12/2012 |
| KR | 10-2014-0013186 | A | 2/2014 |
| KR | 10-1367577 | B1 | 2/2014 |
| KR | 10-2010-0040103 | A | 4/2019 |
| WO | 2004/028680 | A1 | 4/2004 |

OTHER PUBLICATIONS

Julien Marie, et al., “Platinum supported on resorcinol-formaldehyde based carbon aerogels for PEMFC electrodes: Influence of the carbon support on electrocatalytic properties”, Journal of Applied Electrochemistry, 2006, vol. 37, No. 1, pp. 147-153 (7 pages total).

Yirong Lin, et al., “Superhydrophobic Functionalized Graphene Aerogels”, ACS Applied Materials & Interfaces, 2011, vol. 3, No. 7, pp. 2200-2203 (6 pages total).

Rashmi Singh, et al., “Facile synthesis of highly conducting and mesoporous carbon aerogel as platinum support for PEM fuel cells”, International Journal of Hydrogen Energy, 2017, vol. 42, No. 16, pp. 11110-11117 (8 pages total).

International Search report of PCT/KR2017/003264 filed Jul. 10, 2017.

* cited by examiner

NANOSTRUCTURED ELECTRODE FOR POLYMER ELECTROLYTE MEMBRANE FUEL CELL, AND MANUFACTURING METHOD THEREFOR

CROSS REFERENCE TO RELATED APPLICATIONS

This application is a National Stage of International Application No. PCT/KR2017/003264 filed Mar. 27, 2017, claiming priority based on Korean Patent Application No. 10-2016-0038437 filed Mar. 30, 2016.

TECHNICAL FIELD

The present invention relates to a nanostructured electrode for a polymer electrolyte fuel cell, a manufacturing method thereof, and a fuel cell comprising the same. More specifically, the present invention relates to a nanostructured electrode for a polymer electrolyte fuel cell, a manufacturing method thereof, and a fuel cell comprising the same, wherein the nanostructured electrode can obtain excellent current density and power density even with a relatively small amount of catalyst by having improved catalyst performance due to nanostructuring of an ionomer, uniform catalyst dispersion and increased catalyst utilization ratio, can also obtain a price reduction effect through a decrease in the amount of catalyst used, and is excellent in the mass transfer efficiency and low humidification performance.

BACKGROUND ART

Fuel cells, as cells including a power generation system of directly converting chemical reaction energy such as an oxidation/reduction reaction of hydrogen and oxygen contained in a hydrocarbon based fuel substance such as methanol, ethanol or a natural gas into electric energy, have been in the limelight as a next generation clean energy source which is capable of replacing fossil energy due to high energy efficiency and environmentally friendly characteristics of reducing the emission of pollutants.

The fuel cells have an advantage that the fuel cells can generate various output ranges by a stack configuration due to stacking of unit cells, and exhibit 4 to 10 times of an energy density compared to small lithium batteries. Therefore, the fuel cells have been receiving attention as a small and mobile portable power supply.

A stack substantially generating electricity in the fuel cells has a structure in which several to tens of unit cells including a membrane-electrode assembly (MEA) and a separator (or bipolar plate) are stacked, and the membrane-electrode assembly generally has a structure in which an oxidization electrode (anode or fuel electrode) and a reduction electrode (cathode or air electrode) are each formed on both sides of an electrolyte membrane.

The fuel cells can be divided into an alkali electrolyte fuel cell, a polymer electrolyte membrane fuel cell (PEMFC) and others according to conditions and types of the electrolyte. The polymer electrolyte membrane fuel cell among the fuel cells has been in the limelight as a portable, vehicle or household power supply device due to its advantages such as a low operating temperature of less than 100° C., fast starting and response characteristics, excellent durability and the like.

Typical examples of the polymer electrolyte membrane fuel cell may include a proton exchange membrane fuel cell (PEMFC) using hydrogen gas as a fuel, a direct methanol fuel cell (DMFC) using a liquid methanol as a fuel, and others.

Summarizing a reaction occurring in the polymer electrolyte membrane fuel cell, when the fuel such as the hydrogen gas is first supplied to the oxidization electrode, hydrogen ions ($H^+$) and electrons ($e^-$) are generated by an oxidation reaction of hydrogen in the oxidization electrode. The generated hydrogen ions are transferred to the reduction electrode through a polymer electrolyte membrane, and the generated electrons are transferred to the reduction electrode through an external circuit. Oxygen is supplied to the reduction electrode, and oxygen is combined with the hydrogen ions and electrons to generate water by a reduction reaction of oxygen.

Electrodes of a fuel cell can be manufactured through an electrode forming composition including an ionomer and a solvent, and combination and dispersion degree between the ionomer and the solvent have a great effect on performance and durability of the cell.

On the other hand, since a nanoporous aerogel, as an ultra-porous high specific surface area material having a porosity of about 80 to 99% by volume and a pore size range of 1 to 100 nm, has the most excellent properties such as ultra-light weight, super heat-insulation and ultra-low dielectric properties which are the lightest and the most excellent among materials that have been developed to date by mankind, a research on the aerogel materials as a super capacitor, an electrode material for seawater desalination, a ultralow-dielectric material and optical and acoustic materials as well as a development research on aerogel materials have been actively performed.

Particularly required are new application products and technology development of the silica aerogel in addition to new market expansion of a silica aerogel as a promising material having infinite applicability in energy/environmental/electric and electronic fields such as an energy saving material, a sound absorption material, a fireproof material or the like for building, industries, space aviation, shipbuilding and others.

However, there have been no cases of using the silica aerogel as an electrode material up to now.

DISCLOSURE

Technical Problem

An objective of the present invention is to provide a nanostructured electrode for a polymer electrolyte fuel cell, wherein the nanostructured electrode can obtain excellent current density and power density even with a relatively small amount of catalyst by having improved catalyst performance due to nanostructuring of an ionomer, uniform catalyst dispersion and increased catalyst utilization ratio, can also obtain a price reduction effect through a decrease in the amount of catalyst used, and is excellent in the mass transfer efficiency and low humidification performance.

Other objective of the present invention is to provide a manufacturing method of the electrode.

Another objective of the present invention is to provide a fuel cell comprising the electrode.

Technical Solution

An electrode according to an embodiment of the present invention is provided, the electrode including: a three-dimensional nanostructure including a nanoporous aerogel and an ionomer surrounding the surface of the aerogel; and a catalyst dispersed in the three-dimensional nanostructure.

The three-dimensional nanostructure may include a plurality of the aerogels, the aerogels are connected to each other to form the three-dimensional nanostructure, and the ionomer may surround the surface of the aerogels having a shape of the three-dimensional nanostructure.

The aerogel may be a silica aerogel.

The aerogel may have a surface area of 100 to 1000 $m^2/g$ and a pore size of 1 to 20 nm.

The aerogel may be included in an amount of 1 to 8% by weight with respect to the total electrode.

The surface of the aerogel may be substituted with a hydrophobic functional group.

The hydrophobic functional group may be any one selected from the group consisting of a methyl group, an ethyl group, a propyl group, a butyl group, a pentyl group, and a combination thereof.

The ionomer may be coupled to the aerogel through the hydrophobic functional group.

The ionomer may include a hydrophobic main chain and a hydrophilic side chain, and may be disposed such that the hydrophobic main chain of the ionomer faces the hydrophobic functional group of the aerogel, and the hydrophilic side chain of the ionomer faces the catalyst.

The hydrophilic side chain of the ionomer may be selected from the group consisting of a sulfonic acid group, a carboxylic acid group, a phosphoric acid group, a phosphonic acid group, and a derivative thereof.

The catalyst may be coupled to the three-dimensional nanostructure.

The catalyst may include catalytic metal particles alone or catalytic metal particles supported on a support.

A manufacturing method of the electrode according to other embodiment of the present invention is provided, the manufacturing method comprising the steps of mixing a nanoporous aerogel with an ionomer to prepare a mixture, adding a catalyst to the mixture to prepare an electrode forming composition, and coating the electrode forming composition to manufacture the electrode.

The manufacturing method may further comprise the step of transferring the electrode to a polymer electrolyte membrane after the step of manufacturing the electrode.

The transferring process may be performed at 100 to 150° C. and 1 to 10 MPa.

A fuel cell including the electrode according to another embodiment of the present invention is provided.

ADVANTAGEOUS EFFECTS

The electrode of the present invention can obtain excellent current density and power density even with a relatively small amount of catalyst by having improved catalyst performance due to nanostructuring of an ionomer, uniform catalyst dispersion and increased catalyst utilization ratio, can also obtain a price reduction effect through a decrease in the amount of catalyst used, and is excellent in the mass transfer efficiency and low humidification performance.

MODE FOR INVENTION

Figure 1:
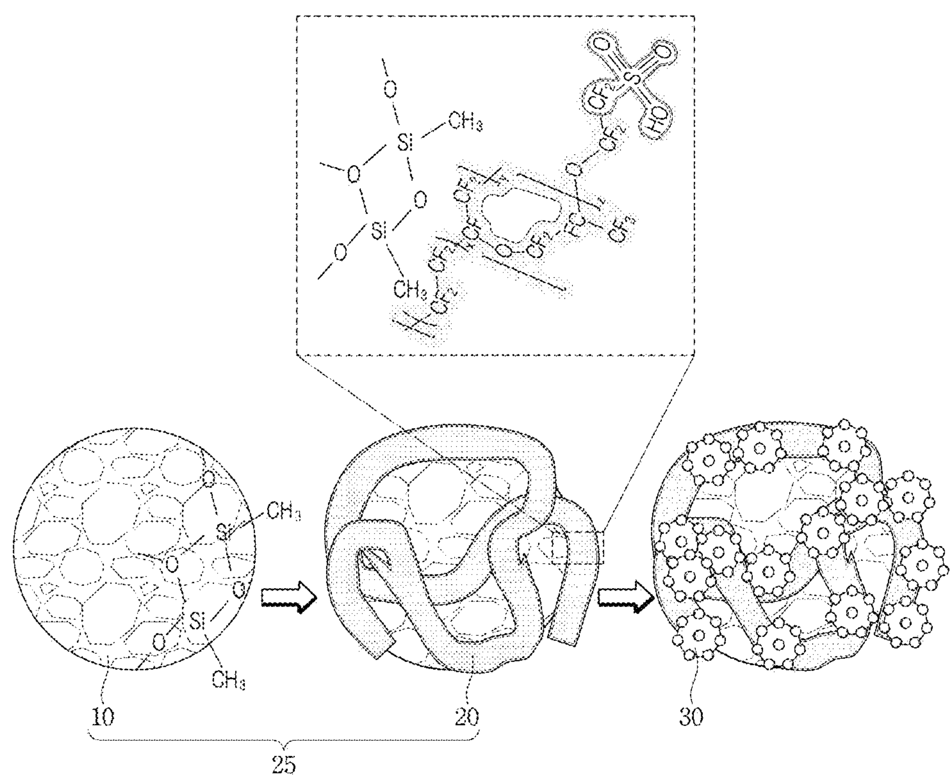
FIG. 1 is a schematic diagram showing an electrode material according to an embodiment of the present invention.

Hereinafter, embodiments of the present invention will be described in detail. However, these embodiments are only exemplary, and the present invention is not limited thereto, but defined by the scope of claims to be described later.

An electrode according to an embodiment of the present invention comprises an electrode material including: a three-dimensional nanostructure including a nanoporous aerogel and an ionomer surrounding the surface of the aerogel; and a catalyst dispersed in the three-dimensional nanostructure.

The electrode can obtain excellent current density and power density even with a relatively small amount of a catalytic material through an organic combination among the aerogel, the ionomer and the catalyst.

Specifically, the electrode enables the ionomer to have a three-dimensional cubic structure while surrounding the surface of the aerogel by using the aerogel as a frame for forming a nanostructure.

At the same time, the electrode can obtain excellent current density and power density even with a small amount of the catalyst by allowing the catalyst to be dispersed in an ionomer having the three-dimensional cubic structure, thereby uniformly dispersing the catalyst such that utilization ratio of the catalyst is increased.

Further, the electrode is excellent in mass transfer efficiency by using pores of the aerogel as an additional mass transfer passage, and improves low humidification performance by securing moisture through the pores of the aerogel.

Any aerogels having a nanoporous structure may be used as the aerogel. Specifically, a silica aerogel may be used as the aerogel, and low humidification performance of the electrode can be further improved particularly when the silica aerogel is used.

Surface area and pore size of the aerogel are not limited in the present invention, and the aerogel can be used although the aerogel is a commercialized aerogel having any surface area and pore size. For example, the aerogel may have a surface area of 100 to 1000 $m^2/g$ and a pore size of 1 to 20 nm.

The aerogel may be included in an amount of 1 to 8% by weight with respect to the total electrode. The addition effect may be insignificant since the content is slight when a content of the aerogel is less than 1% by weight. It may be difficult to sufficiently include the catalyst since the content is high when the content of the aerogel is more than 8% by weight.

The surface of the aerogel may be hydrophobically treated. The hydrophobically treated surface of the aerogel may be substituted with a hydrophobic functional group. The hydrophobic functional group may be an alkyl group having 1 to 5 carbon atoms. Specifically, the hydrophobic functional group may be any one selected from the group consisting of a methyl group, an ethyl group, a propyl group, a butyl group, a pentyl group, and a combination thereof.

The three-dimensional nanostructure is formed by using the aerogel as a frame for forming a nanostructure, wherein a plurality of aerogels are connected to each other to form a three-dimensional nanostructure, and the ionomer forms the three-dimensional nanostructure while surrounding the surface of the aerogels having a shape of the three-dimensional nanostructure.

At this time, if the surface of the aerogel is hydrophobically treated, the three-dimensional structure of the ionomer may be coupled to the aerogel through the hydrophobic functional group.

FIG. 1 is a schematic diagram showing the electrode material. Referring to FIG. 1, the surface of the aerogel 10 is substituted with a methyl group ($CH_3$) that is a hydrophobic functional group, and the ionomer 20 forms the three-dimensional nanostructure 25 while surrounding the surface of the aerogel 10 in a three-dimensional shape. At this time, the three-dimensional nanostructure 25 is disposed such that a hydrophobic portion of the ionomer 20 faces a hydrophobic functional group of the aerogel 10, and a hydrophilic portion of the ionomer 20 faces the catalyst 30. Therefore, as a coupling ratio of the three-dimensional nanostructure 25 with the catalyst (30) increases, and the catalyst (30) is combined with shape of the three-dimensional nanostructure 25, dispersion and utilization ratio of the catalyst (30) increase.

The ionomer may be a cationic conductor having a cation exchange group such as proton, or an anionic conductor having an anion exchange group such as a hydroxyl ion, carbonate or bicarbonate.

The cation exchange group may be any one selected from the group consisting of a sulfonic acid group, a carboxyl group, a boronic acid group, a phosphoric acid group, an imide group, a sulfonimide group, a sulfonamide group, and a combination thereof. In general, the cation exchange group may be the sulfonic acid group or the carboxyl group.

The cationic conductor may comprise: a fluoro-based polymer which includes the cation exchange group and includes a fluorine in a main chain thereof; a hydrocarbon-based polymer such as benzimidazole, polyamide, polyamideimide, polyimide, polyacetal, polyethylene, polypropylene, acrylic resin, polyester, polysulfone, polyether, polyether imide, polyether sulfone, polycarbonate, polystyrene, polyphenylenesulfide, polyether ether ketone, polyether ketone, polyarylethersulfone, polyphosphazene, or polyphenyl quinoxaline; a partially fluorinated polymer such as a polystyrene-graft-ethylenetetrafluoroethylene copolymer or a polystyrene-graft-polytetrafluoroethylene copolymer; sulfone imide; and others.

More specifically, when the cationic conductor is a hydrogen ion cationic conductor, the polymers may include a cation exchange group selected from the group consisting of a sulfonic acid group, a carboxylic acid group, a phosphoric acid group, a phosphonic acid group, and a derivative thereof in a side chain thereof. Specific examples of the cationic conductor may comprise: a fluoro-based polymer including a tetrafluoroethylene-fluorovinylether copolymer including poly(perfluorosulfonic acid), poly(perfluorocarboxylic acid), and a sulfonic acid group, defluorinated polyether ketone sulfide, or a mixture thereof; and a hydrocarbon-based polymer including sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, and a mixture thereof. However, the specific examples of the cationic conductor are not limited thereto.

Further, the cationic conductor may have H substituted with Na, K, Li, Cs or tetrabutylammonium in the cation exchange group at a side chain terminal thereof. H is substituted with Na using NaOH during the preparation of a catalyst composition when substituting H with Na in the cation exchange group of the side chain terminal. H is substituted with tetrabutylammonium using tetrabutylammonium hydroxide when substituting H with tetrabutylammonium. K, Li or Cs may be substituted using suitable compounds. This substitution is well-known in this related field and will not be illustrated in detail.

The cationic conductor may be used singularly or in a combination, and the cationic conductor may be used along with a non-conductive compound to further improve adherence selectively with a polymer electrolyte membrane. It is preferable to use the cationic conductor in a controlled amount depending on the purpose.

Examples of the non-conductive compound may include one or more selected from the group consisting of polytetrafluoroethylene (PTFE), tetrafluoroethylene-hexafluoropropylene copolymer (FEP), tetrafluoroethylene-perfluoro alkyl vinyl ether copolymer (PFA), ethylene/tetrafluoroethylene (ETFE), ethylene-chlorotrifluoroethylene copolymer (ECTFE), polyvinylidene fluoride, polyvinylidene fluoride-hexafluoropropylene copolymer (PVdF-HFP), dodecylbenzene sulfonic acid, and sorbitol.

The anionic conductor is a polymer capable of transferring an anion such as a hydroxyl ion, carbonate or bicarbonate, a hydroxide or halide (generally chloride) type anionic conductor is commercially available, and the anionic conductor may be used in an industrial water purification process, a metal separation process, a catalytic process, and others.

A polymer doped with a metal hydroxide may be generally used as the anionic conductor. Specific examples of the anionic conductor may include poly(ethersulfone), polystyrene, vinyl-based polymer, poly(vinyl chloride), poly(vinylidene fluoride), poly(tetrafluoroethylene), poly(benzimidazole), poly(ethylene glycol) and the like which are doped with the metal hydroxide.

Commercialized examples of the ionomer may include Nafion, aquivion, and others.

The ionomer may be included in an amount of 20 to 50% by weight with respect to the total electrode. Generated ions may not be transferred well when a content of the ionomer is less than 20% by weight. Supply of hydrogen or oxygen (air) is difficult, and an active area for performing a reaction process may be reduced since pores are insufficient when the content of the ionomer is more than 50% by weight.

The catalyst may include any catalysts which can be used as a catalyst in a hydrogen oxidation reaction or an oxygen reduction reaction. Desirably, it is preferable to use a platinum-based metal as the catalyst.

The platinum-based metal may include one selected from the group consisting of platinum (Pt), palladium (Pd), ruthenium (Ru), iridium (Jr), osmium (Os), platinum-M alloy (M is one or more selected from the group consisting of palladium (Pd), ruthenium (Ru), iridium (Ir), osmium (Os), gallium (Ga), titanium (Ti), vanadium (V), chromium (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La) and rhodium (Rh)), and a combination thereof. More preferably, the platinum-based metal may include a combination of two or more metals selected from the platinum-based catalytic metal group. However, the platinum-based metal is not limited thereto, but the platinum-based metal may include the platinum-based catalytic metals without limitation if platinum-based catalytic metals are usable in the art.

Further, the catalyst may include metal itself, and a catalytic metal supported on a support.

The support may be selected from a carbon-based support, a porous inorganic oxide of zirconia, alumina, titania, silica, ceria or the like, zeolite, and others. The carbon-based support may be selected from super P, carbon fiber, carbon sheet, carbon black, Ketjen black, acetylene black, carbon nanotube (CNT), carbon sphere, carbon ribbon, fullerene, activated carbon, and a combination of one or more thereof. However, the carbon-based support is not limited thereto, but the carbon-based support may include the supports without limitation if supports are usable in the art.

The catalytic metal particles may be positioned on the surface of the support, or may be penetrated into the support while filling inner pores of the support.

Examples of the catalytic metal particles supported on the support as the catalyst may include a commercialized article on the market and a catalyst produced by supporting the catalytic metal particles on the support. The process of supporting a precious metal on the support is well-known in the art. Therefore, although related detailed descriptions are skipped, the process can be easily understood to people who work in the art.

The catalytic metal particles may be contained in an amount of 20 to 90% by weight of the total catalyst. Activities may be deteriorated when the catalytic metal particles are contained in an amount of less than 20% by weight, and catalytic activities may be reversely deteriorated since active area of the catalytic metal particles is decreased due to agglomeration of the catalytic metal particles when the catalytic metal particles are contained in an amount of more than 90% by weight.

The catalyst may be included in an amount of 42 to 79% by weight with respect to the total electrode. Activities may be deteriorated due to lack of the catalyst when the catalyst is included in an amount of less than 42% by weight, and the catalyst may be disadvantageous in ion conduction due to lack of the ionomer when the catalyst is included in an amount of more than 79% by weight.

A manufacturing method of an electrode according to another embodiment of the present invention includes the steps of: mixing a nanoporous aerogel with an ionomer to prepare a mixture; adding a catalyst to the mixture to prepare an electrode forming composition; and coating the electrode forming composition to manufacture the electrode.

First, the nanoporous aerogel is mixed with the ionomer to prepare the mixture. At this time, a plurality of the aerogels may be added.

Detailed descriptions of the nanoporous aerogel and the ionomer are the same as described in the description of the electrode according to an embodiment of the present invention, and thus the detailed descriptions thereof will be omitted.

A process of mixing the nanoporous aerogel with the ionomer may be conducted in a solution. Specifically, the process may be performed by adding the nanoporous aerogel to a commercialized ionomer solution, and then adding an additional solvent to the nanoporous aerogel-added commercialized ionomer solution.

Examples of a solvent for preparing the solution, a solvent included in the ionomer solution, or a solvent which can be used as the additional solvent may include a solvent selected from the group consisting of water, a hydrophilic solvent, an organic solvent, and a mixture of one or more thereof.

Examples of the hydrophilic solvent may include solvents including a linear or branched saturated or unsaturated hydrocarbon with 1 to 12 carbon atoms as a main chain, the solvents having one or more functional groups selected from the group consisting of alcohol, ketone, aldehyde, carbonate, carboxylate, carboxylic acid, ether and amide, and the solvents may include an alicyclic or aromatic cyclic compound as at least a portion of the main chain.

The organic solvent may be selected from N-methylpyrrolidone, dimethyl sulfoxide, tetrahydrofuran, and a mixture thereof.

The ionomer and the aerogels form a three-dimensional nanostructure through the above-described mixing process.

On the other hand, the surface of the aerogel may be hydrophobically treated. Accordingly, the hydrophobically treated surface of the aerogel may be substituted with a hydrophobic functional group. A detailed description of the aerogel is the same as described in the description of the electrode according to an embodiment of the present invention, and thus the detailed description thereof will be omitted.

Next, the electrode forming composition is prepared by adding the catalyst to a mixture of the aerogel and the ionomer. At this time, the catalyst may be added to the mixture after dispersing the catalyst in a wetting solution, or the catalyst may also be added to the mixture in a solid state.

Detailed descriptions of the catalyst and the solvent for preparing the wetting solution are the same as described above, the detailed descriptions thereof will be omitted.

Further, the prepared electrode forming composition may be prepared through any one dispersion method selected from ultrasonic dispersion, stirring, three roll mill, planetary agitation, high pressure dispersion, and a mixed method thereof after adding the catalyst to the mixture. The catalyst is dispersed in the surface of the ionomer having the three-dimensional cubic structure through the dispersion method.

Next, the electrode is manufactured by coating the electrode forming composition.

It is preferable when coating the electrode forming composition that the catalyst-dispersed electrode forming composition is continuously or intermittently transferred to a coater, and then the catalyst-dispersed electrode forming composition is uniformly coated to a dry thickness of 10 to 200 μm on a substrate.

More specifically, after continuously transferring the electrode forming composition to a coater such as a die, a gravure, a bar, a comma coater or the like through a pump depending on the viscosity of the electrode forming composition, the electrode forming composition is uniformly coated on the substrate such that an electrode layer has a dry thickness of 10 to 200 μm, more preferably 10 to 100 μm using a method such as slot die coating, bar coating, comma coating, screen printing, spray coating, doctor blade coating, brush or the like, and the solvent is volatilized from the electrode forming composition while passing the electrode forming composition coated on the substrate through a drying furnace which is maintained to a predetermined temperature.

Activities may be deteriorated due to a small reaction area when the electrode forming composition is coated to a thickness of less than 1 μm, and resistance may be increased as moving distances of ions and electrons are increased when the electrode forming composition is coated to a thickness of more than 200 μm.

The drying process may be a process of drying the electrode forming composition at a drying temperature of 25 to 90° C. for a drying time of 6 hours or more. A problem that a sufficiently dried electrode cannot be formed may be generated when the drying temperature is less than 25° C., and the drying time is less than 6 hours. A problem such as cracks or the like of the electrode may occur when drying the electrode forming composition at a temperature of more than 90° C.

Meanwhile, the manufacturing method of the electrode may further comprise the step of transferring the electrode to the polymer electrolyte membrane after the step of manufacturing the electrode.

For this, it is necessary to transfer the electrode to the polymer electrolyte membrane after manufacturing the electrode by coating the electrode forming composition on a release film. At this time, a method of coating the electrode forming composition on the release film is the same as the method of coating the electrode forming composition except that the release film instead of the substrate is used.

A step of cutting the dried electrode and release film to required sizes to transfer the electrode to the polymer electrolyte membrane may be performed after manufacturing the electrode by coating the electrode forming composition on the release film.

The polymer electrolyte membrane is a solid polymer electrolyte including an ion conductor, and the polymer electrolyte membrane may be formed in the form of a single layer in which the ion conductor is formed of a sheet or a film, or a reinforced membrane in which the ion conductor is filled in a porous support.

The ion conductor may be a cationic conductor having a cation exchange group such as proton, or an anionic conductor having an anion exchange group such as a hydroxyl ion, carbonate or bicarbonate. Accordingly, the polymer electrolyte membrane may be a cation exchange membrane or an anion exchange membrane.

The cation exchange group may be any one selected from the group consisting of a sulfonic acid group, a carboxyl group, a boronic acid group, a phosphoric acid group, an imide group, a sulfonimide group, a sulfonamide group, and a combination thereof. In general, the cation exchange group may be the sulfonic acid group or the carboxyl group.

The cationic conductor may comprise: a fluoro-based polymer which includes the cation exchange group and includes a fluorine in a main chain thereof; a hydrocarbon-based polymer such as benzimidazole, polyamide, polyamideimide, polyimide, polyacetal, polyethylene, polypropylene, acrylic resin, polyester, polysulfone, polyether, polyether imide, polyether sulfone, polycarbonate, polystyrene, polyphenylenesulfide, polyether ether ketone, polyether ketone, polyarylethersulfone, polyphosphazene, or polyphenyl quinoxaline; a partially fluorinated polymer such as a polystyrene-graft-ethylenetetrafluoroethylene copolymer or a polystyrene-graft-polytetrafluoroethylene copolymer; sulfone imide; and others.

More specifically, when the cationic conductor is a hydrogen ion cationic conductor, the polymers may include a cation exchange group selected from the group consisting of a sulfonic acid group, a carboxylic acid group, a phosphoric acid group, a phosphonic acid group, and a derivative thereof in a side chain thereof. Specific examples of the cationic conductor may comprise: a fluoro-based polymer including a tetrafluoroethylene-fluorovinylether copolymer including poly(perfluorosulfonic acid), poly(perfluorocarboxylic acid), and a sulfonic acid group, defluorinated polyether ketone sulfide, or a mixture thereof; and a hydrocarbon-based polymer including sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, and a mixture thereof. However, the specific examples of the cationic conductor are not limited thereto.

The anionic conductor is a polymer capable of transferring an anion such as a hydroxyl ion, carbonate or bicarbonate, a hydroxide or halide (generally chloride) type anionic conductor is commercially available, and the anionic conductor may be used in an industrial water purification process, a metal separation process, a catalytic process, and others.

A polymer doped with a metal hydroxide may be generally used as the anionic conductor. Specific examples of the anionic conductor may include poly(ethersulfone), polystyrene, vinyl-based polymer, poly(vinyl chloride), poly(vinylidene fluoride), poly(tetrafluoroethylene), poly(benzimidazole), poly(ethylene glycol) and the like which are doped with the metal hydroxide.

A transfer step of attaching the electrode and an electrolyte membrane may be carried out by applying heat and pressure to a metal press alone or both the metal press and the soft plate in a state that a soft plate made of a rubber material such as a silicone rubber material is put over the metal press.

The transfer process can be performed at a temperature of 100 to 150° C. and a pressure of 1 to 10 MPa. The electrode layer may not be properly transferred onto the release film when performing a hot pressing process at conditions of 100° C. and less than 1 MPa. It is apprehended that structural degeneration of the electrode layer occurs while polymer of the electrolyte membrane is burning when the temperature exceeds 150° C. The transfer process may not be performed properly as an effect of pressing the electrode layer becomes larger than transferring of the electrode when performing the hot pressing process at a condition of exceeding 10 MPa.

The membrane-electrode assembly can be manufactured by removing the release film after the transfer step.

The membrane-electrode assembly includes: an anode electrode and a cathode electrode which are positioned to face each other; and a polymer electrolyte membrane which is positioned between the anode electrode and the cathode electrode, wherein the above-described electrode is used as at least one of the anode electrode and the cathode electrode.

Another embodiment of the present invention provides a fuel cell including the electrode.

Hereinafter, the embodiments are illustrated in more detail with reference to examples. However, it will be understood that the embodiments are not limited to the particular details described. Further, descriptions which have not been described here are descriptions which can be sufficiently inferred by people who are skilled in the art, and the descriptions are omitted.

Preparation Example 1: Preparing Electrode Forming Compositions

Example

A solution 1 was prepared by mixing 0.2 g of a silica aerogel, 6.5 g of a 20% ionomer solution (Dupont, D2021) and 9 g of an additional solvent. A solution 2 was prepared by dipping and dissolving 3 g of a commercial catalyst Pt/C (Tanaka) into 15 g of a wetting solution. An aerogel-ionomer-catalyst mixed electrode forming composition was prepared by injecting the commercial catalyst solution 2 into the mixed aerogel-ionomer solution 1 and uniformly mixing the commercial catalyst solution 2 with the mixed aerogel-ionomer solution 1 by stirring and ultrasonic dispersion.

Comparative Example 3 g of the commercial catalyst Pt/C (Tanaka) was dipped into 15 g of the wetting solution to obtain a dipped mixed catalyst. 6.5 g of the 20% ionomer solution and 9 g of the additional solvent were added to the dipped mixed catalyst to prepare an electrode forming composition.

Manufacturing Example 2-1: Manufacturing Membrane-Electrode Assemblies

After bar-coating the electrode forming compositions prepared in Example and Comparative Example on a polyimide release film at conditions of a coating speed of 10 mm/s and a coating thickness of 100 μm, electrodes were manufactured by drying the electrode forming compositions coated on the polyimide release film at 60° C. for 3 hours.

Membrane-electrode assemblies were manufactured by stripping the release films after transferring the electrode forming compositions onto the polymer electrolyte membrane by performing a hot pressing process in such a manner of cutting the dried electrodes to a required size, aligning the cut electrodes such that an electrode surface and an electrolyte membrane are put over both sides of a polymer electrolyte membrane (Dupont, Nafion 212 Membrane), pressing the electrodes and the polymer electrolyte membrane at heat and pressure conditions of 100° C. and 10 MPa for 5 minutes, and maintaining the pressed electrodes and polymer electrolyte membrane at room temperature for one minute.

A fuel cell including a stack including one or more of the membrane-electrode assemblies were manufactured.

Manufacturing Method 2-2: Manufacturing a Membrane-Electrode Assembly with a Reduced Catalyst Content After bar-coating the electrode forming composition prepared in Example on a polyimide release film at conditions of a coating speed of 10 mm/s and a coating thickness of 50 μm, an electrode was manufactured by drying the electrode forming composition coated on the polyimide release film at 60° C. for 3 hours.

The dried electrode was manufactured into a membrane-electrode assembly by the same method as in Manufacturing Example 2-1.

Experimental Example 1: Evaluating Humidification Performance of a Membrane-Electrode Assembly Output characteristics of a voltage current density of an electrode were evaluated at respective relative humidity values of RH 100 and RH 50 on the membrane-electrode assembly manufactured using the electrode forming composition of Example in Manufacturing Example 2-1, and evaluation results are shown in FIG. 2.

Figure 2:
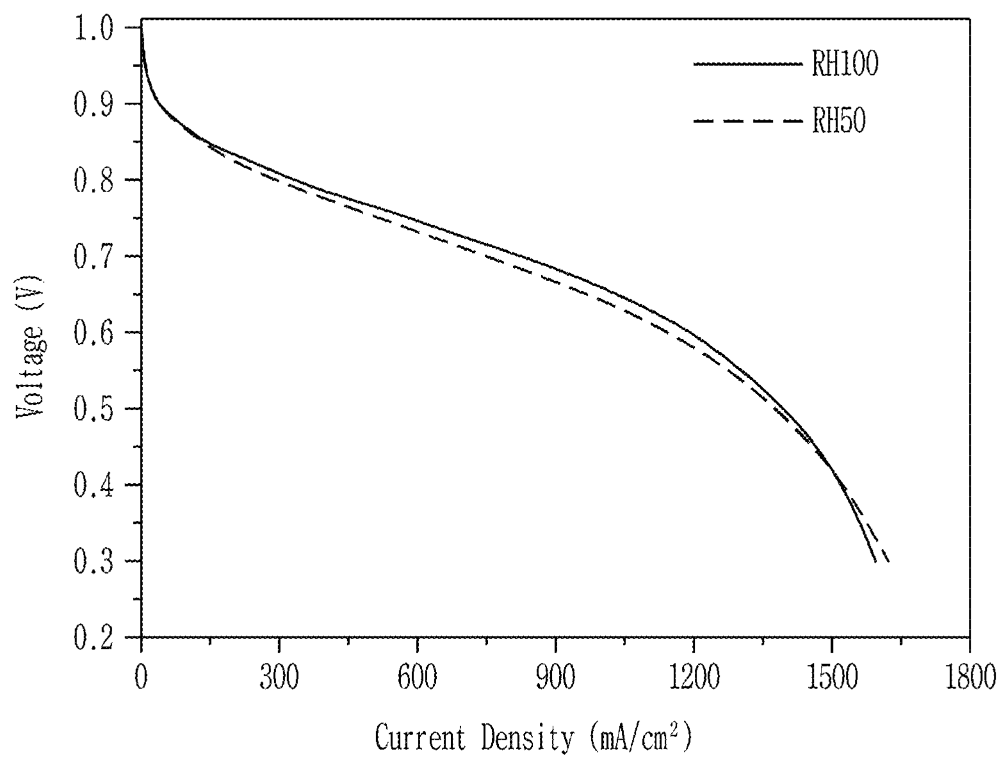
FIG. 2 is a graph showing a humidification performance evaluation result of a membrane-electrode assembly measured at Experimental Example 1 of the present invention.

Referring to FIG. 2, it can be confirmed that low humidity characteristics are excellent since the membrane-electrode assembly has similar voltage value and current density value although the relative humidity values of the membrane-electrode assembly vary.

Experimental Example 2: Evaluating Performance of Membrane-Electrode Assemblies

After measuring voltage and current values outputted from electrodes with respect to a membrane-electrode assembly with a catalyst content of 0.30 mg (Comparative Example) manufactured using the electrode forming composition of Comparative Example in Manufacturing Method 2-1 and a membrane-electrode assembly with a catalyst content of 0.15 mg (Example) manufactured using the electrode forming composition of Example in Manufacturing Method 2-2, voltage-current density output characteristics (discharge performance) of the membrane-electrode assemblies were comparatively evaluated. Evaluation results of the membrane-electrode assemblies are shown in FIG. 3.

Figure 3:
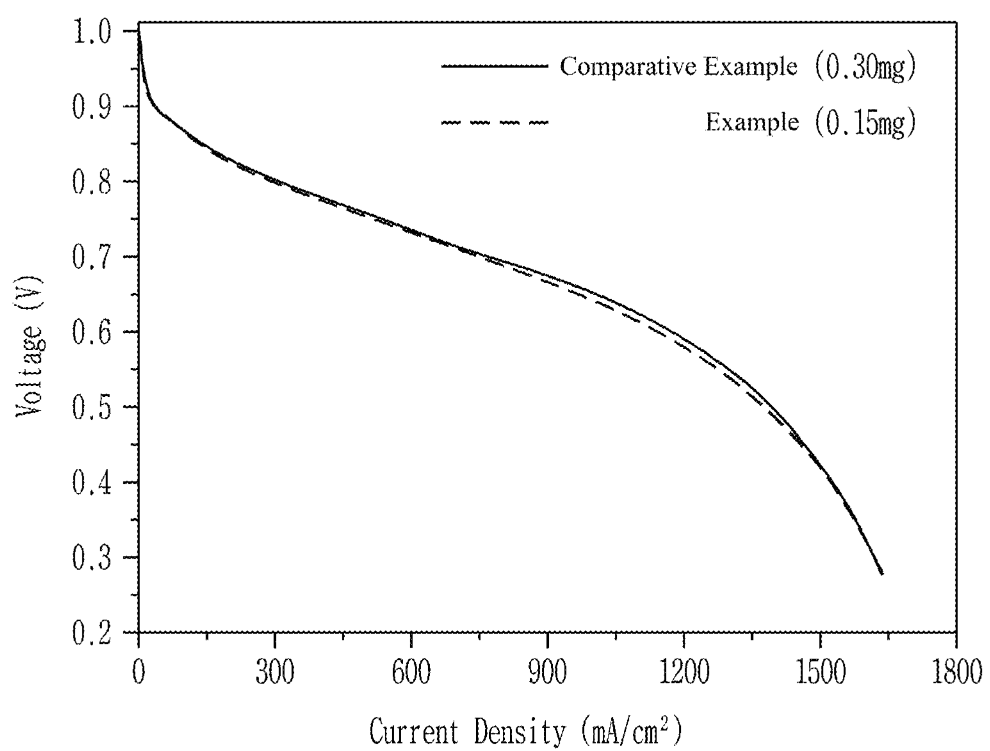
FIG. 3 is a graph showing performance evaluation results of membrane-electrode assemblies measured at Experimental Example 2 of the present invention.

Referring to FIG. 3, it can be confirmed that the electrode manufactured using the electrode forming composition of Example in Manufacturing Example 2-2 has voltage performance according to current density similar to that of the electrode manufactured using the electrode forming composition of Comparative Example in Manufacturing Example 2-1 although the electrode manufactured using the electrode forming composition of Example in Manufacturing Example 2-2 includes a small amount of the catalyst compared to the electrode manufactured using the electrode forming composition of Comparative Example in Manufacturing Example 2-1.

Although the present invention has been described along with the accompanying drawings, this is only one of various examples including the gist of the present invention and has an object of enabling a person having ordinary skill in the art to easily practice the invention. Accordingly, it is evident that the present invention is not limited to the aforementioned examples. Accordingly, the range of protection of the present should be interpreted based on the following claims, and all of technological spirits within the equivalents of the present invention may fall within the range of right of the present invention by changes, substitutions and replacements without departing from the gist of the present invention. Furthermore, it is evident that the configurations of some drawings have been provided to more clearly describe configurations and have been more exaggerated or reduced than actual configurations.

INDUSTRIAL APPLICABILITY

A nanostructured electrode for a polymer electrolyte fuel cell according to the present invention is a promising material in energy/environmental/electric and electronic fields which can obtain excellent current density and power density even with a relatively small amount of catalyst by having improved catalyst performance due to nanostructuring of the ionomer, uniform catalyst dispersion and increased catalyst utilization ratio, can also obtain a price reduction effect through a decrease in the amount of the catalyst used, and is excellent in the mass transfer efficiency and low humidification performance by including: a three-dimensional nanostructure including a nanoporous aerogel and an ionomer surrounding the surface of the aerogel; and a catalyst dispersed in the three-dimensional nanostructure.

The invention claimed is:

1. An electrode comprising:

a three-dimensional nanostructure including a nanoporous aerogel and an ionomer surrounding the surface of the aerogel; and a catalyst dispersed in the three-dimensional nanostructure, wherein the surface aerogel is substituted with a hydrophobic functional group.

2. The electrode of claim 1, wherein the three-dimensional nanostructure includes a plurality of the aerogels, the aerogels are connected to each other to form the three-dimensional nanostructure, and the ionomer surrounds the surface of the aerogels having a shape of the three-dimensional nanostructure.

3. The electrode of claim 1, wherein the aerogel is a silica aerogel.

4. The electrode of claim 1, wherein the aerogel has a surface area of 100 to 1000 $m^2/g$ and a pore size of 1 to 20 nm.

5. The electrode of claim 1, wherein the aerogel is included in an amount of 1 to 8% by weight with respect to the total electrode.

6. The electrode of claim 1, wherein the hydrophobic functional group is any one selected from the group consisting of a methyl group, an ethyl group, a propyl group, a butyl group, a pentyl group, and a combination thereof.

7. The electrode of claim 1, wherein the ionomer is coupled to the aerogel through the hydrophobic functional group.

8. The electrode of claim 1, wherein the ionomer includes a hydrophobic main chain and a hydrophilic side chain, and is disposed such that the hydrophobic main chain of the ionomer faces the hydrophobic functional group of the aerogel, and the hydrophilic side chain of the ionomer faces the catalyst.

9. The electrode of claim 8, wherein the hydrophilic side chain of the ionomer includes a cation exchange group selected from the group consisting of a sulfonic acid group, a carboxylic acid group, a phosphoric acid group, a phosphonic acid group, and a derivative thereof.

10. The electrode of claim 1, wherein the catalyst is coupled to the three-dimensional nanostructure.

11. The electrode of claim 1, wherein the catalyst includes catalytic metal particles alone or catalytic metal particles supported on a support.

12. A manufacturing method of an electrode, the manufacturing method comprising the steps of:

mixing a nanoporous aerogel with an ionomer to prepare a mixture;

adding a catalyst to the mixture to prepare an electrode forming composition; and coating the electrode forming composition to manufacture the electrode.

13. The manufacturing method of claim 12, further comprising the step of transferring the electrode to a polymer electrolyte membrane after the step of manufacturing the electrode.

14. The manufacturing method of claim 13, wherein the transferring process is performed at 100 to 150° C. and 1 to 10 MPa.

15. A fuel cell including the electrode according to claim 1.

* * * * *